United States Patent
Kumazawa

[11] 4,057,327
[45] Nov. 8, 1977

[54] DRIVE APPARATUS FOR AN OPTICAL SYSTEM

[75] Inventor: Kenichi Kumazawa, Machida, Japan

[73] Assignee: Canon Kabushiki Kaisha, Tokyo, Japan

[21] Appl. No.: 643,960

[22] Filed: Dec. 23, 1975

Related U.S. Application Data

[63] Continuation of Ser. No. 465,511, April 30, 1974, abandoned.

[30] Foreign Application Priority Data

May 8, 1973 Japan .................................. 48-50956

[51] Int. Cl.² .............................................. G02B 7/04
[52] U.S. Cl. .................................... 350/187; 350/255; 354/195
[58] Field of Search ................ 350/187, 255; 354/195; 74/625

[56] References Cited
U.S. PATENT DOCUMENTS

| | | | |
|---|---|---|---|
| 3,224,351 | 12/1965 | Strasser | 350/187 |
| 3,324,780 | 6/1967 | Miyauchi | 350/187 |
| 3,424,514 | 1/1969 | Back et al. | 350/187 |
| 3,834,796 | 10/1974 | Komine | 350/187 |

*Primary Examiner*—Conrad J. Clark
*Attorney, Agent, or Firm*—Toren, McGeady and Stanger

[57] ABSTRACT

A drive apparatus for the axial displacement of components of an optical system to effect focusing or zooming adjustment includes a first drive assembly of servo type and a second drive assembly. The first drive assembly is provided with a clutch connected thereto and to an operable member for displacing the displaceable components along the optical axis of the optical system upon setting the clutch in the engaged position to transmit the motion of the servo motor to the operable member. The setting of the clutch into the disengaged position can be effected by attachment of a manual drive mechanism to the second drive assembly from the outside of the housing. Thus, the apparatus can be readily set to either of the mechanical and manual operation conditions.

4 Claims, 7 Drawing Figures

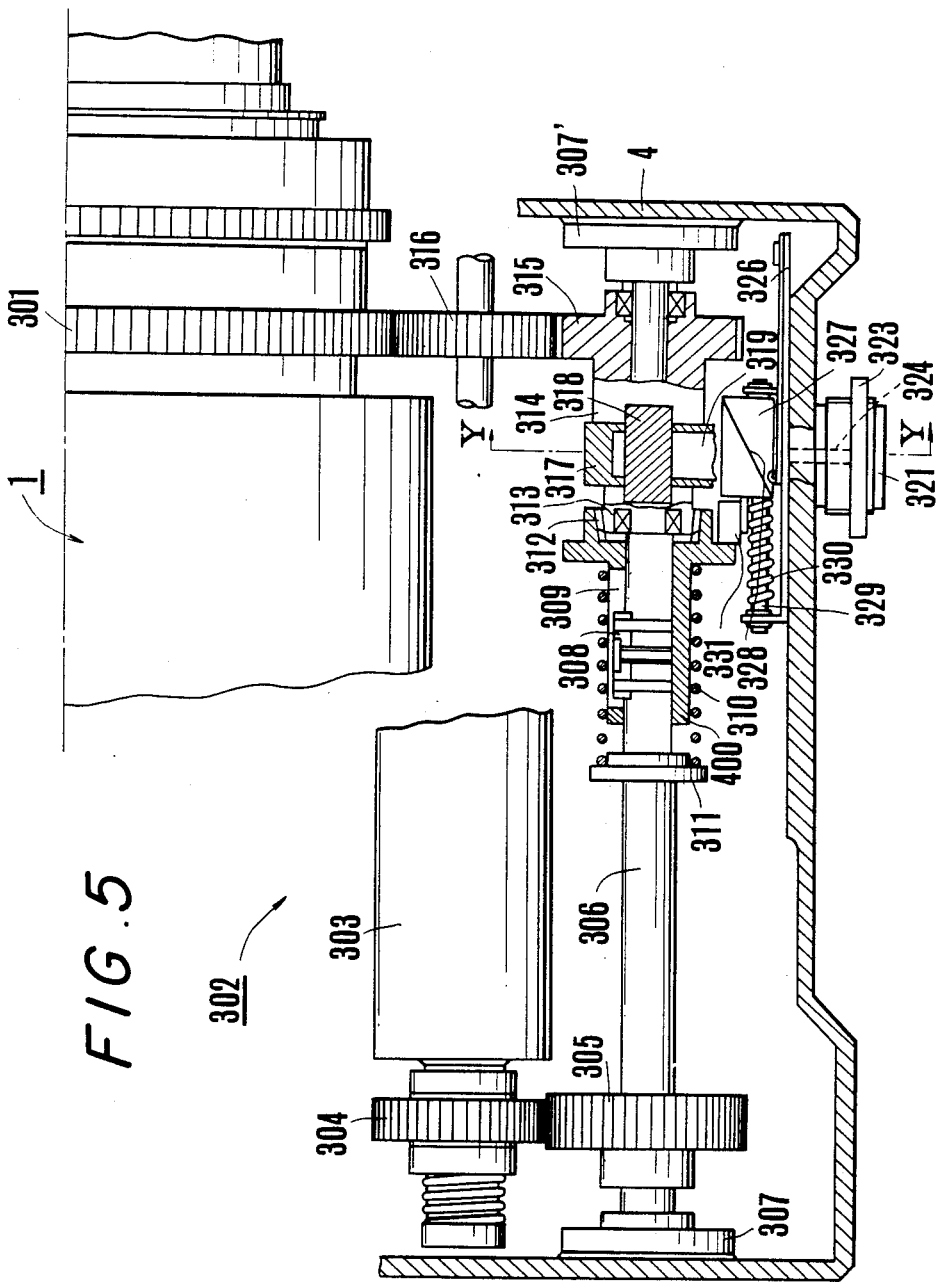

DRIVE APPARATUS FOR AN OPTICAL SYSTEM

This is a continuation of application Ser. No. 465,511 filed on Apr. 30, 1974, now abandoned.

This invention relates to a drive apparatus for the axial displacement of components of an optical system to effect focusing or zooming adjustment which apparatus can be selectively set to either of the mechanical and manual operation conditions.

Various type of apparatus for driving the lens-adjusting mechanism are known in the art which are designed to operate with either a servo drive system or a manual drive system. The apparatus provided with two drive systems has an advantage that even if one of the systems is damaged, the apparatus can be operated by employment of the other system. Further, with the apparatus, it is possible to insure a more efficient performance of the optical system than that of an equivalent optical system associated with an otherwise designed drive apparatus having only one drive system. In setting the conventional drive apparatus of the former type from the manual operation condition to the servo drive operation condition, and vice versa, however, in most cases, a servo drive system is attached to and detached from the lens-adjusting mechanism mounted in the drive apparatus. Such a setting procedure is very time-consuming and troublesome.

Accordingly, it is an object of the present invention to provide an apparatus for driving the lens-adjusting mechanism which can be selectively set to either a manual operation condition or a mechanical operation condition.

Another object of the invention is to provide an apparatus of the character described above including a servo drive assembly with clutch means positioned between said assembly and an optical component-operable member where upon engagement of a manual drive mechanism to the operable member to set the clutch means to their disengaged position the motion of the servo motor in the servo drive assembly is not transmitted to the operable member.

Other objects and features of the invention will become apparent from the following detailed description taken in conjunction with the accompanying drawings in which:

FIG. 5 is a fragmentary partly elevational partly longitudinal vertical section view of a third embodiment of a drive apparatus of the invention adapted for the axial displacement of zooming members of a zoom lens system.

Figure 1:
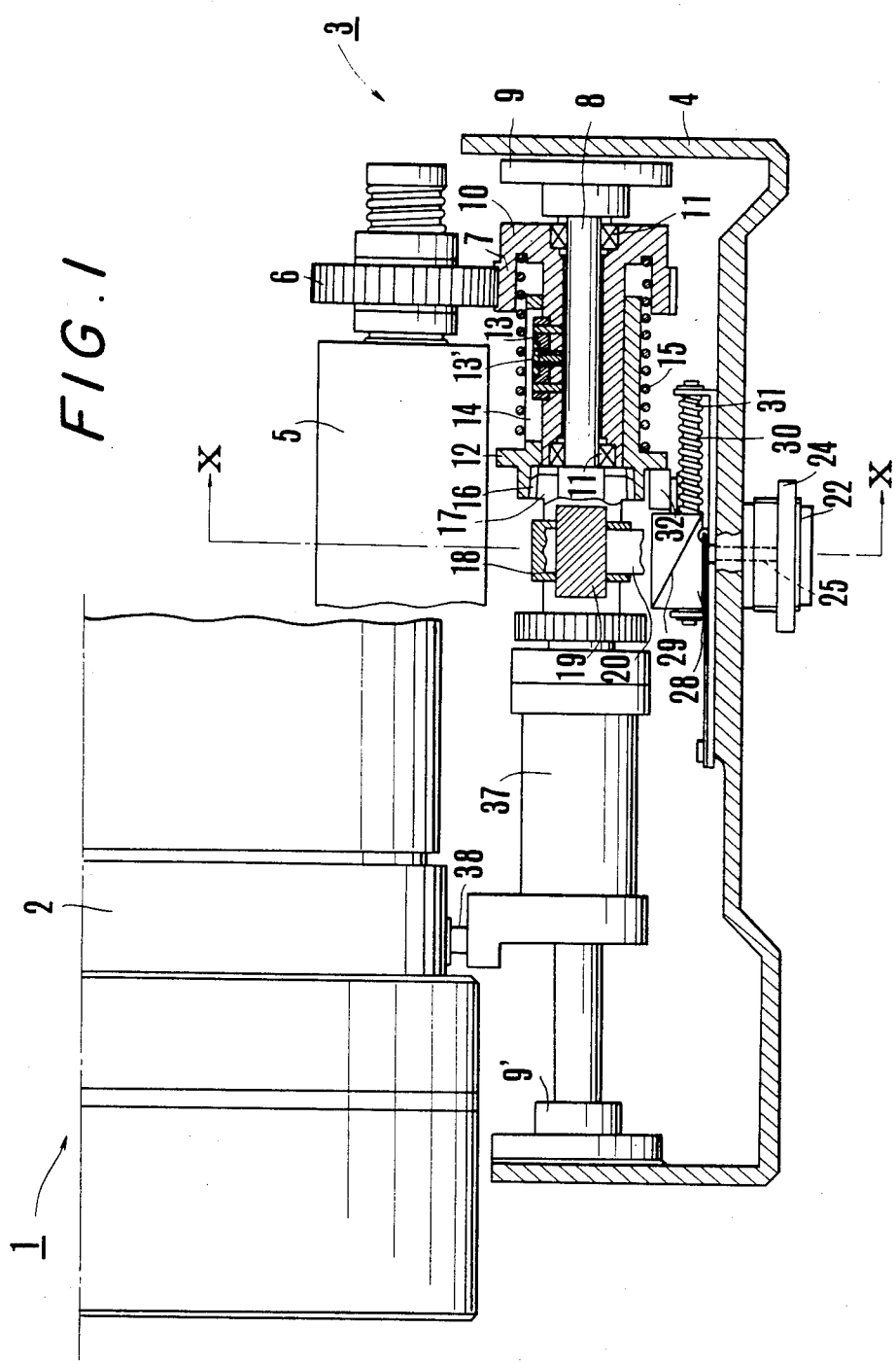
FIG. 1 is a fragmentary partly elevational partly longitudinal vertical section view of a first embodiment of a drive apparatus of the invention adapted for the axial displacement of a focusing member of a zoom lens system.
Figure 3:
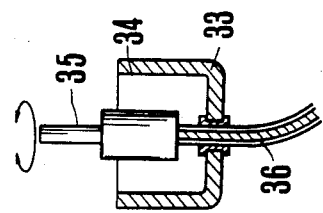
FIG. 3 is a partly sectional partly elevational view of an adapter of a manual drive mechanism for attachment to the apparatus of FIG. 1.
Figure 2:
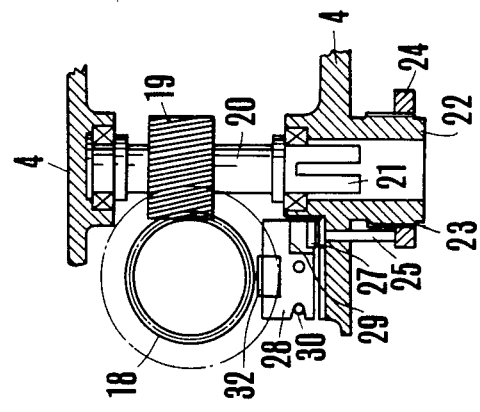
FIG. 2 is a partly sectional partly elevational view on the plane normal to the plane of FIG. 1 taken along line X — X of FIG. 1 and looking in the direction of the arrows.

Referring to FIGS. 1 through 3, there is shown a preferred embodiment of the apparatus of the invention adapted for driving the mechanism for the axial adjustment of a focussing member of an optical objective system that is generally indicated at 1. The objective system 1 includes a focusing member carried in a slidable barrel 2. The slidable barrel 2 is fixedly mounted through a connector 38 on an operable member 37 associated with a lens-adjusting mechanism such as a helicoid mechanism for displacing the focusing member along the optical axis of the objective 1. The apparatus for driving the mechanism 37 for the axial adjustment of the focusing member is generally indicated at 3, and is illustrated as comprising a housing 4 and a servo drive assembly comprising a servo motor 5 fixedly mounted in the housing 4, a gear 6 fixedly mounted on the shaft of the motor 5, an external hollow shaft 10 having a radially offset annular flange which is integral with the outer end position of the shaft 10 and has an external geared portion engaging the gear 6. The external shaft 10 is rotatably mounted through forward and rearward bushings 11 on an internal shaft 8 which can rotate in the shaft mounts 9 and 9'. The external shaft 10 is prevented from moving longitudinally relative to the shaft 8 by means known in the art. Clutch means are constructed as comprising a slidable sleeve 12 having a first clutch gear 16 and movably mounted on the external shaft 10 and a second clutch gear 17 fixedly mounted on the shaft 8 for engagement with the clutch gear 16. The sleeve 12 has a longitudinally elongated slot 14 in which a key 13 fixedly mounted in the external shaft 10, is engaged so as to permit the sleeve 12 to move longitudinally of the shaft 10 but not to rotate about the shaft 10. The sleeve 12 is biased by an expansion spring 15 mounted between the radially extending flange of the sleeve 12 and the recess formed in the radially offset annular flange of the external shaft 10 to urge the clutch gear 16 toward the clutch gear 17. Upon sliding movement of the sleeve 12 to the right in the figure, the clutch gear 16 is disengaged from the clutch gear 17 so that the motion of the servo motor 5 cannot be transmitted to the helicoid mechanism 37.

In order to operate the helocoid mechanism 37 manually, there is provided a manual drive assembly comprising a first helical gear 18 fixedly mounted on the shaft 8, a second helical gear 19 engaging the first helical gear 18 and fixedly mounted on a rotary shaft 20. As shown in FIG. 2, the rotary shaft 20 is journaled between an upper shaft mount formed on the wall of the housing 4 and a lower shaft mount provided in the form of a tubular extension 22 in the wall of the housing. The lower end of the rotary shaft 20 has a recess 21 formed therein and adapted for receiving an extension of a rotor 35 rotatably mounted in an adapter shown in FIG. 3. The wire 36 connected in the rotor 35 is driven to rotation through a manual drive mechanism, not shown. The tubular extension 22 has an externally screw-threaded portion 23 for engagement with a corresponding internal screw-thread 34 formed in the inside of a collar 33 of the adapter.

A mechanism which actuates and releases, the pair of the clutch gears 16 and 17 to an engaged position and into a disengaged position, respectively, in response to an attachment and a detachment of the collar 33 to the tubular extension 22 is constructed as comprising a ring 34 slidably mounted on the tubular extension 22, a rod 25 of which one end is fixedly mounted on the ring 24 and of which the other end extends through a hole to the inside of the housing and is abuttingly engaged with a free end of a spring 27 so that upon movement of the ring 24 toward the wall it causes the free end of the spring 27 to move upwardly. The other end of the spring 27 is fixedly mounted on the housing. The actuating mechanism further includes a cam member 28 having a camming surface 29 in which a cam follower is slidably positioned. The cam follower is slidably mounted on a guide rod 30 and is biased by an extension helical spring 31 toward the left in the figure. The cam follower has a projection 32 abuttingly engaging the radially outwardly extending flange of the sleeve 12. With this arrangement of the cam mechanism, the upward movement of the ring 24 effected by the coupling of the adaptor to the tubular extension 22 for manual operation of the apparatus of the invention causes the cam follower to move to the right against the force of the extension helical spring 31, with the result that the slidable sleeve 12 is moved to the right against the force of the extension helical spring 15, thereby the clutch gear 16 is disengaged from the clutch gear 17.

The apparatus shown in FIGS. 1, 2 and 3 can be selectively set to either mechanical or manual operation conditions in the manner to be described hereinbelow.

In the mechanical operation, the adapter is detached from the tubular extension 22 to establish the mating meshed relationship of the clutch gears 16 and 17, thereupon the motion of the servo motor 5 is transmitted through a train of the gears 6 and 7 and the clutch means to the rotary shaft 8. Rotation of the shaft 8 results in an axial movement of the helicoid mechanism 37 along the shaft 8 to effect focusing adjustment of the objective system 1. The rotation of the shaft 8 also causes rotation of the helical gears 18 and 19 and the shaft 20, but it provides no significant result.

For manual operation, the adapter shown in FIG. 3 is attached to and firmly secured on the tubular extension 22, thereupon the rotor 35 is engaged with the shaft 20. At the same time, the ring 24 is moved upwardly by engagement with the upper edge of the collar 33 of the adapter, so that the free end of the spring 27 is forced upwardly, thereby the cam follower is moved to the right against the force of the expansion helical spring 31 along the guide rod 30. Such a movement of the cam follower causes the sleeve 12 to move to the right relative to the external shaft 10 against the force of the expansion helical spring 15, resulting in the disengagement of the clutch gear 16 from the clutch gear 17. Rotation of the rotor 35 causes rotation of the shaft 8 through the helical gears 18 and 19 to effect a focusing adjustment in a manner similar to that described in connection with the mechanical operation.

When the adapter is detached from the mechanism, the spring 27 pushes down the rod 25 and the cam follower is returned to its initial position under the expansion force of the helical spring 31, so that the sleeve 12 is moved to the left under the expansion force of the helical spring 15, thereby the clutch gear 16 being engaged with the clutch gear 17.

Figure 4:
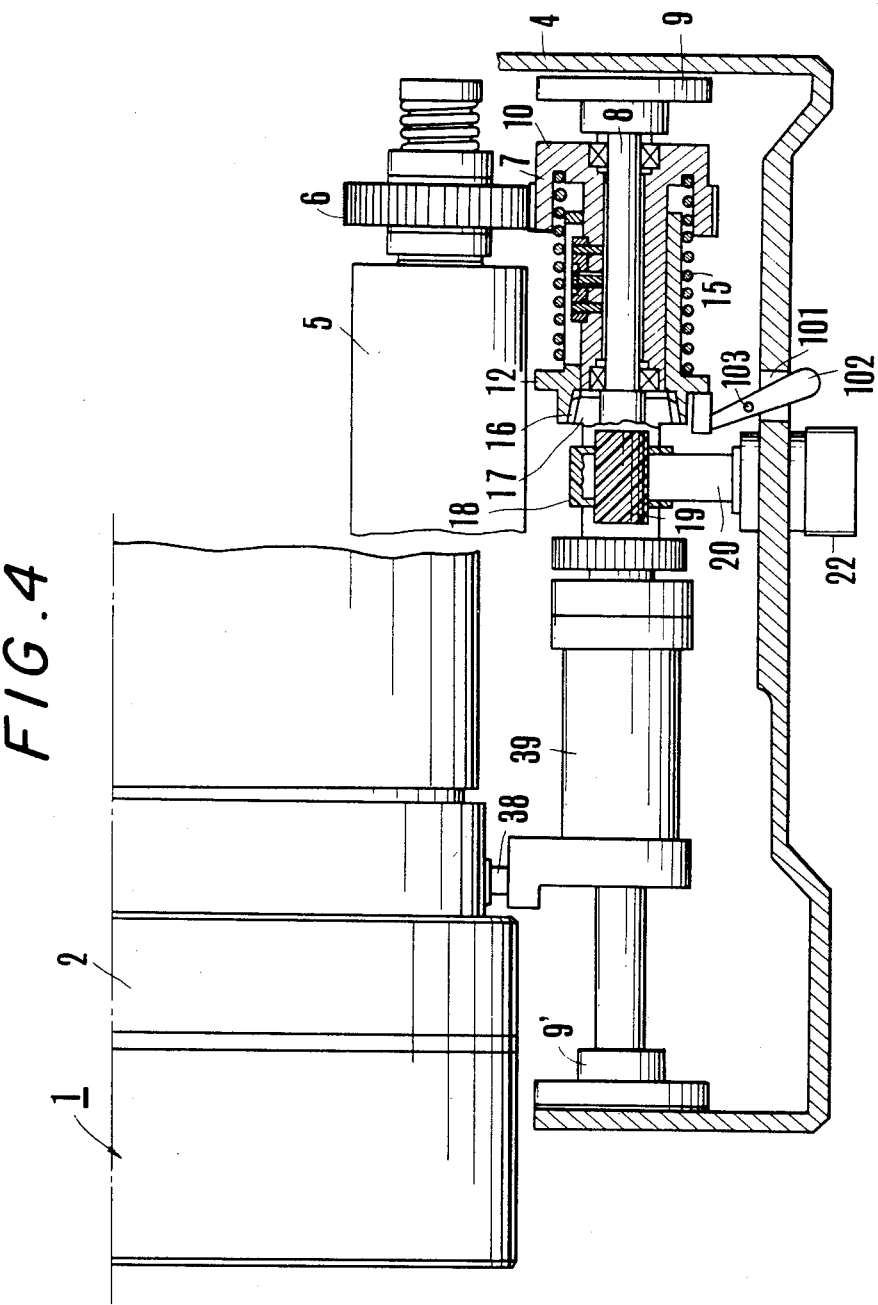
FIG. 4 illustrates a partial variation of the apparatus of FIG. 1 according to a second embodiment of the invention.

FIG. 4 shows the second embodiment of the apparatus of the invention adapted for axial adjustment of a focusing member of an objective system. Whilst the first embodiment of the apparatus is provided with an automatic actuating mechanism for actuating and releasing the clutch means, the second embodiment is provided with a manually actuating mechanism. The manually actuating mechanism is constructed as comprising a lever 102 which is fulcrumed at a pivot pin 103 in a slot 101 bored in the wall of the housing 4. The end of one arm of the lever 102 in the inside of the housing is abuttingly engaged with the radially extending flange of the sleeve 12 so that upon turning the lever 102 in the clockwise direction as viewed in FIG. 4, the clutch gear 16 is disengaged from the clutch gear 17. It is desirable to provide a setting means for setting the lever 102 in the advanced position.

Figure 6:
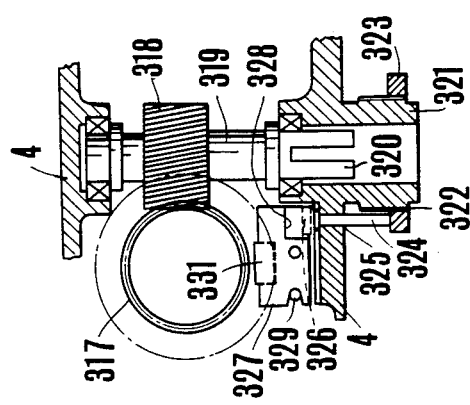
FIG. 6 is a partly elevational partly sectional view on a plane normal to the plane of FIG. 5 taken along line Y — Y of FIG. 5 and looking in the direction of the arrows.

Referring now to FIGS. 5 and 6, there is shown the third embodiment of an apparatus of the invention adapted for driving the mechanism for the axial adjustment of zooming components of a zoom lens system that is generally indicated at 1. The lens mount for the zoom lens system 1 has a zoom operation gear 301 engaging an intervening gear 316 of the drive apparatus of the invention. The apparatus for driving the mechanism for the axial adjustment of the zooming members is generally indicated at 302, and is illustrated as comprising a housing 4, a servo drive assembly comprising a servo motor 303 fixedly mounted in the housing 4, a gear 304 fixedly mounted on the shaft of the motor 303, a gear 305 engaging the gear 304 and fixedly mounted on a shaft 306. The shaft 306 is rotatably mounted in shaft mounts 307 and 307' attached to the wall of the housing 4. Clutch means are constructed as comprising a slidable sleeve 400 having a first clutch gear 312 and mounted on the shaft 306, and a second clutch gear 313 fixedly mounted on the external hollow shaft 314 for engagement with the clutch gear 312. The external shaft 314 is prevented from longitudinally moving relative to the shaft 306 by means known in the art. The sleeve 400 has a longitudinally elongated slot 309 in which a pin 308 fixedly mounted in the shaft 306 is engaged so as to permit the sleeve 400 to move longitudinally of the shaft 306 but not to rotate about the shaft 306. The sleeve 400 is biased by an expansion spring 310 mounted between the radially extending flange of the sleeve 400 and a flanged ring 311 fixedly mounted on the shaft 306 to urge the clutch gear 312 toward th clutch gear 313. Upon sliding movement of the sleeve 400 to the left in the figure, the clutch gear 312 is disengaged from the clutch gear 313. The external shaft 314 has a gear 315 mounted at one end portion thereof and engaging the intervening gear 316.

The apparatus 302 further includes a manual drive assembly comprising a first helical gear 317 fixedly mounted on the external shaft 314 a second helical gear 318 engaging the first helical gear 317 and fixedly mounted on a rotary shaft 319. As shown in FIG. 6, the rotary shaft 319 is journally mounted between an upper shaft mount formed on the wall of the housing 4 and a lower shaft mounted provided in the form of a tubular extension 321 in the wall of the housing. The lower end of the rotary shaft 319 has a recess formed therein and adapted for receiving an extension of a rotor 35 rotatably mounted in an adaptor shown in FIG. 3.

A mechanism which actuates and releases a pair of the clutch gears 312 and 313 to an engaged position and to a disengaged position, respectively, in response to an attachment of and a detachment of the collar 33 to the tubular extension 321 is constructed as comprising a ring 323 slidably mounted on the tubular extension 321, a rod 324 of which one is fixedly mounted on the ring 323 and of which the other end extends through a hole to the inside of the housing and is abuttingly engaged with a free end of a spring 326 upon movement of the ring 323 toward the well to cause the free end of the spring 326 to move upwardly. The other end of the spring 326 is fixedly mounted on the housing. The actuating mechanism further includes a cam member 327 having a camming surface 328 on which a cam follower is slidably positioned. The cam follower is slidably mounted on a guide rod 329 and is biased by an extension helical spring 330 toward the right in the figure. The cam follower has a projection 331 abuttingly engaging the radially extending flange of the sleeve 400. With this arrangement of the cam mechanism, the upward movement of the ring 323 effected by the coupling of the adapter to the tubular extension 321 for manual operation of the apparatus of the invention causes the cam follower to move to the left against the force of the extension helical spring 330 with the result that the slidable sleeve 400 is moved to the left against the force of the extension helical spring 310, thereby the clutch gear 312 is disengaged from the clutch gear 313.

In mechanical operation, the adapter is detached from the tubular extension 321 to establish the mating relationship of the clutch gears 312 and 313, thereupon the motion of the servo motor 303 is transmitted through a train of the gears 304 and 305 and the clutch means to the external shaft 314. The rotation of the shaft 314 results in a rotation of the operation gear 301 through the intervening gear 316 effect zooming adjustment of the zoom lens system 1. For manual operation, the adapter shown in FIG. 3 is attached to and firmly secured on the tubular extension 321, thereupon the rotor 35 is engaged with the shaft 319. At the same time the ring 323 is moved upwardly by engagement with the upper edge of the collar 33 of the adapter, so that the free end of the spring 326 is forced to move upward, thereby the cam follower is moved to the left against the force of the expansion helical spring 330 along the guide rod 329. Such a movement of the cam follower causes the sleeve 400 to move to the left relative to the shaft 306 against the force of the expansion helical spring 310, resulting in the disengagement of the clutch gear 312 from the clutch gear 313. Rotation of the rotor 35 causes rotation of the shaft 314 through the helical gears 317 and 318 to effect a focusing adjustment in a manner similar to that described in connection with the mechanical operation.

When the adapter is detached from the mechanism the spring 326 pushes down the rod 324 and the cam follower is returned to its initial position under the expansion force of the helical spring 330 so that the sleeve 400 is moved to the right under the expansion force of the helical spring 15, thereby the clutch gear 312 being engaged with the clutch gear 313.

Figure 7:
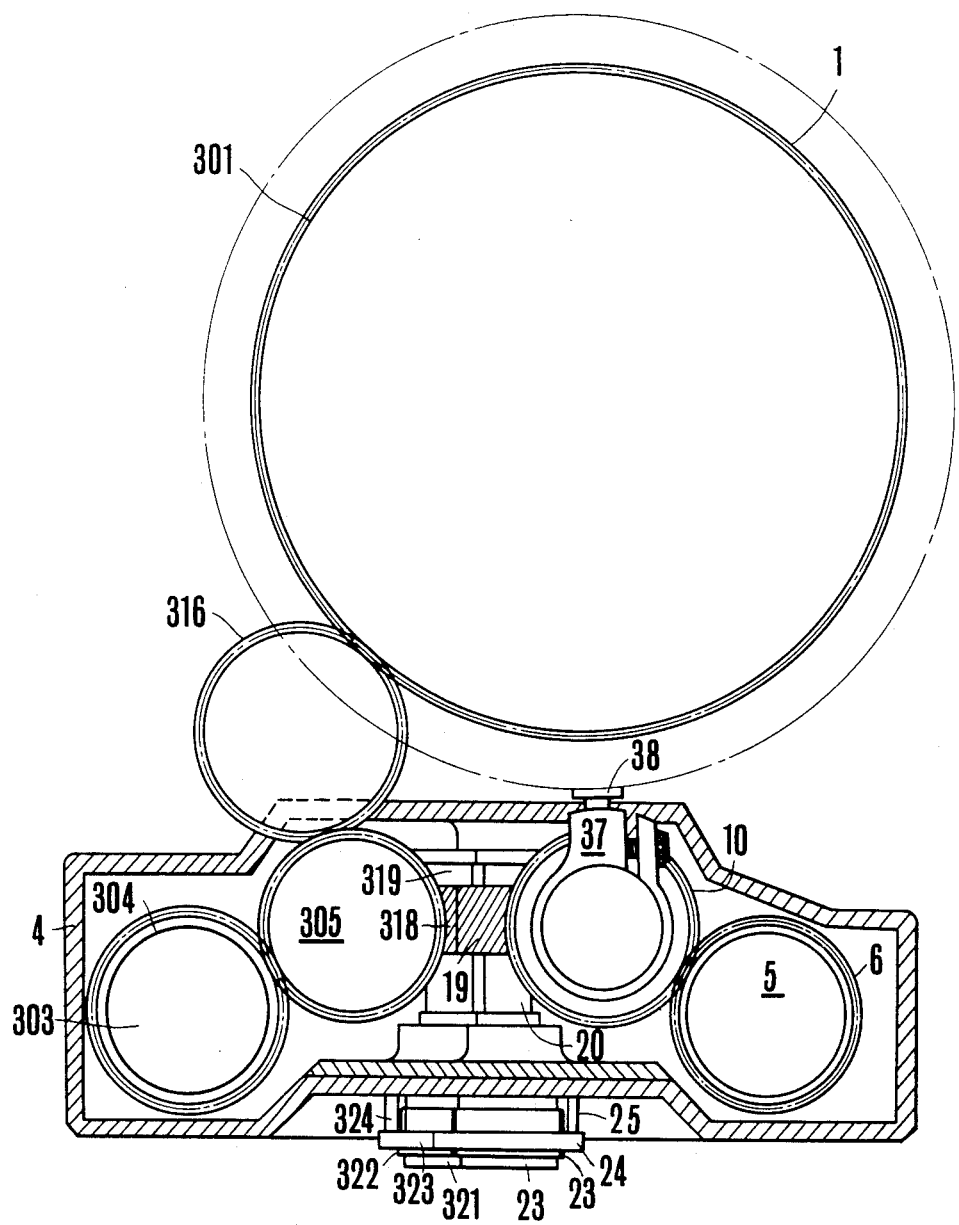
FIG. 7 is a fragmentary transversal vertical section view of a drive apparatus of the invention in which the first and second embodiments shown in FIGS. 1 and 4 are realized in a preferred configuration for a zoom lens system.

FIG. 7 illustrates a combination of the first and second embodiments of the invention in an apparatus adapted for a zoom lens system. According to the arrangment shown in the FIG. 7, it is possible to provide a compact apparatus.

What is claimed is:

1. A driving apparatus for an optical system having an optical axis, said optical system comprising a fixed section including a fixed optical component and a displaceable section including a movable optical component displaceable relative to said fixed optical component along the optical axis of the system, the driving apparatus comprising:
   an operable member connected to said displaceable optical component, a mechanical drive assembly including a motor means, a clutch means having an engaged position for connecting said mechanical drive assembly to said operable member and a disengaged position for disengaging said mechanical drive assembly from said operable means,
   an intermediate manual drive means connected to said operable member and including a connecting member spaced from the point of the connection to said operable member,
   a manual drive assembly including a coupling member selectively connectable to said connecting member for manually driving said operable member,
   control means for selecting the engaged or disengaged positions of said clutch means,
   said intermediate manual drive means including movable means engageable with said coupling member and being displaceable between an extended position when it is disengaged from said coupling member and a retracted position when it is engaged with said coupling member for actuating said control means and locating said clutch means in the disengaged position, and
   contact means displaceable by said movable means when said movable means is in the retracted position and said contact means arranged in the displaceable position in conjunction with said control means for effecting the disengagement of said clutch means.

2. A driving apparatus for an optical system having an optical axis, said optical system comprising a fixed section including a fixed optical component and a displaceable section including a movable optical component displaceable relative to said fixed optical component along the optical axis of the system, the driving apparatus comprising a housing, a first shaft rotatably mounted in said housing, a driven fear fixed to said first shaft, a hollow second shaft rotatably mounted on said first shaft and secured on said first shaft against axial displacement, a first gear formed on said second shaft, an operable member located in said housing and connected to said displaceable optical component and axially displaceably mounted on said first shaft for displacing the movable optical component along the optical axis of the system, a mechanical drive assembly arranged in the housing and including a motor for driving said mechanical drive assembly, said mechanical drive assembly including a second gear in meshed engagement with said first gear, clutch means having an engaged positions and a disengaged position located in said housing between said operable member and said mechanical drive assembly and arranged in the engaged position to transmit the motion of said motor to said operable member, said clutch means includes a sleeve displaceably mounted on said second shaft, a third gear formed on said sleeve, a fourth gear fixed to said first shaft and arranged to be displaceably engaged with said third gear, means biasing said third gear into meshed engagement with said fourth gear, a manual drive assembly includes first means located within said housing and disposed in engagement with said helical gear on said first shaft, said second means accessible on the exterior of said housing and engageable with said first means for manually rotating said first shaft and operating said operable member, said first means including a release device in operative engagement with said sleeve slidable on said second shaft and said release device being displaceable upon the engagement of said second means on said first means for displacing said sleeve against said biasing means for moving said clutch means to the disengaged position.

3. A driving apparatus for an optical system, as set forth in claim 2, wherein said first means includes a tubular extension secured to and extending outwardly from said housing, said second means includes a collar threadably engageable with said tubular extension, said release device comprises a rod axially displaceably mounted in said tubular extension and displaceable when said collar is engaged on said tubular extension, a spring member mounted in said housing in the path of movement of said rod, a displaceable cam assembly located in said housing in contact with said spring and said sleeve, said spring being displaceable by said rod against said cam assembly for displacing said cam assembly against said sleeve for axially displacing said sleeve on said second shaft for placing said clutch means in the disengaged position.

4. A driving apparatus for an optical system, as set forth in claim 3, wherein said cam assembly includes a guide rod, a cam member movably displaceably mounted on said guide rod between a first position where said clutch means is in the engaged position and a second position where said clutch means is in the disengaged position, a spring on said guide rod biasing said cam member into the first position, a follower on said cam member in contact with said sleeve, and a cam surface on said cam member engageable by said spring so that when said spring is displaced by said rod it displaces said cam member against the biasing effect on said spring and said cam follower on said cam member acts against said sleeve for placing said clutch means in the disengaged position.

* * * * *